(12) United States Patent
Gati

(10) Patent No.: US 8,760,894 B2
(45) Date of Patent: Jun. 24, 2014

(54) FEEDBACK OF OUTPUT VOLTAGE ERROR VIA CURRENT SENSE WINDING

(75) Inventor: Thomas Gati, Irvine, CA (US)

(73) Assignee: Microsemi Corporation, Aliso Viejo, CA (US)

( * ) Notice: Subject to any disclaimer, the term of this patent is extended or adjusted under 35 U.S.C. 154(b) by 95 days.

(21) Appl. No.: 13/304,349

(22) Filed: Nov. 24, 2011

(65) Prior Publication Data

US 2012/0176818 A1    Jul. 12, 2012

Related U.S. Application Data

(60) Provisional application No. 61/431,072, filed on Jan. 10, 2011.

(51) Int. Cl.
*H02M 3/24* (2006.01)
*H02M 3/335* (2006.01)

(52) U.S. Cl.
USPC ............................................................ 363/97

(58) Field of Classification Search
USPC ............ 323/245, 247, 358; 363/21.15, 21.16, 363/21.01, 19, 21.07, 21.08, 25, 97
See application file for complete search history.

(56) References Cited

U.S. PATENT DOCUMENTS

| | | | |
|---|---|---|---|
| 3,329,892 A * | 7/1967 | Arrison | 324/169 |
| 4,347,559 A * | 8/1982 | Sturgeon | 363/21.16 |
| 4,438,485 A * | 3/1984 | Voigt | 363/19 |
| 4,686,617 A * | 8/1987 | Colton | 363/56.1 |
| 4,694,384 A | 9/1987 | Steigerwald | |
| 4,937,727 A * | 6/1990 | Leonardi | 363/97 |
| 4,995,054 A | 2/1991 | Eckersley | |
| 5,877,946 A * | 3/1999 | Fitzgerald | 363/21.03 |
| 6,738,247 B2 * | 5/2004 | Uchida | 361/93.1 |
| 7,158,573 B2 | 1/2007 | Hershbarger | |
| 7,378,889 B2 * | 5/2008 | Wu | 327/176 |
| 2002/0154519 A1 | 10/2002 | Nakahara | |
| 2005/0093731 A1 | 5/2005 | Skov | |
| 2008/0130325 A1 * | 6/2008 | Ye | 363/21.14 |

OTHER PUBLICATIONS

MAXIM Application Note 664 Published Maxim Integrated Products 1997.

* cited by examiner

*Primary Examiner* — Gary L Laxton
*Assistant Examiner* — Trinh Dang
(74) *Attorney, Agent, or Firm* — Simon Kahn

(57) ABSTRACT

A power converter constituted of: a control circuitry; an electronically controlled switch responsive to the control circuitry; a power transformer exhibiting a primary winding and a secondary winding; a sense transformer comprising a primary current sense winding, an error current sense winding and a feedback winding, the primary current sense winding of the sense transformer and the primary winding of the power transformer coupled in series with the electronically controlled switch; a transconductance error amplifier coupled to an output of the secondary winding of the power transformer, the transconductance amplifier arranged to drive a current through the error current sense winding of the sense transformer whose value reflects an electrical characteristic of the output of the secondary winding of the power transformer, wherein the feedback winding of the sense transformer is coupled to a feedback input of the control circuitry.

20 Claims, 6 Drawing Sheets

FEEDBACK OF OUTPUT VOLTAGE ERROR VIA CURRENT SENSE WINDING

CROSS-REFERENCE TO RELATED APPLICATION

This application claims priority from U.S. Provisional Patent Application Ser. No. 61/431,072 filed Jan. 10, 2011, entitled "Feedback of Output Voltage Error Via Current Sense Winding", the entire contents of which is incorporated herein by reference.

TECHNICAL FIELD

The present invention relates to the field of DC/DC power supplies, and more particularly to an arrangement wherein an output error voltage is fed back via a current sense winding of a transformer.

BACKGROUND

Isolated power supplies, particularly primary side switched power supplies, typically required feedback of a metric of an electrical characteristic from a secondary side to a primary side. The electrical characteristic may be an output voltage, an output voltage error, an output current or an output current error without limitation. Feedback of an output electrical characteristic according to the prior art may be accomplished by any of a plurality of methods. In a first method, known as a coupled winding feedback, the secondary side electrical characteristic is reflected to the primary side by the turns ratio of the power transformer. In case where high voltage isolation is required, the coupled winding feedback presents a conflict between the need for close coupling, required for feedback, and the need for high isolation voltage. In a second method, a feedback or bias winding is added to the power transformer, the feedback or bias winding voltage reflecting the secondary side electrical characteristic to be controlled. Close coupling between the feedback or bias winding and the secondary winding is required, and in high power cases cross-regulation limits the load-regulation range. Thus, neither of the above solutions is suitable for high power, high voltage situations.

In a third method an opto-isolator or transformer coupler feedback is provided to pass information regarding the electrical characteristic metric from the secondary side to the primary side. Opto-isolators waste energy, and in addition their transfer characteristics vary, inter-alia, with age and temperature. Transformer coupled feedback is stable, however requires additional modulating and demodulating circuitry since transformers are unable to pass DC voltage or current in the absence of additional circuitry.

What is desired, and is not provided by the prior art, is a method of providing feedback of an electrical characteristic from a secondary side to a primary side, suitable for use with high voltage and high loads without requiring an additional transformer with associated electronics.

SUMMARY

In view of the discussion provided above and other considerations, the present disclosure provides methods and apparatus to overcome some or all of the disadvantages of prior and present methods of feedback. Other new and useful advantages of the present methods and apparatus will also be described herein and can be appreciated by those skilled in the art.

This is provided in certain embodiments by providing the electrical characteristic as an error current, and applying the error current to an error sense winding magnetically coupled to the primary current sense winding and to a feedback winding. The primary current sense winding is arranged in series with the primary side electronically controlled switch, and the feedback winding is coupled to a feedback input of the primary side switch control circuitry. Thus, the feedback input comprises both primary side electronically controlled switch current information and error information.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Figure 1:
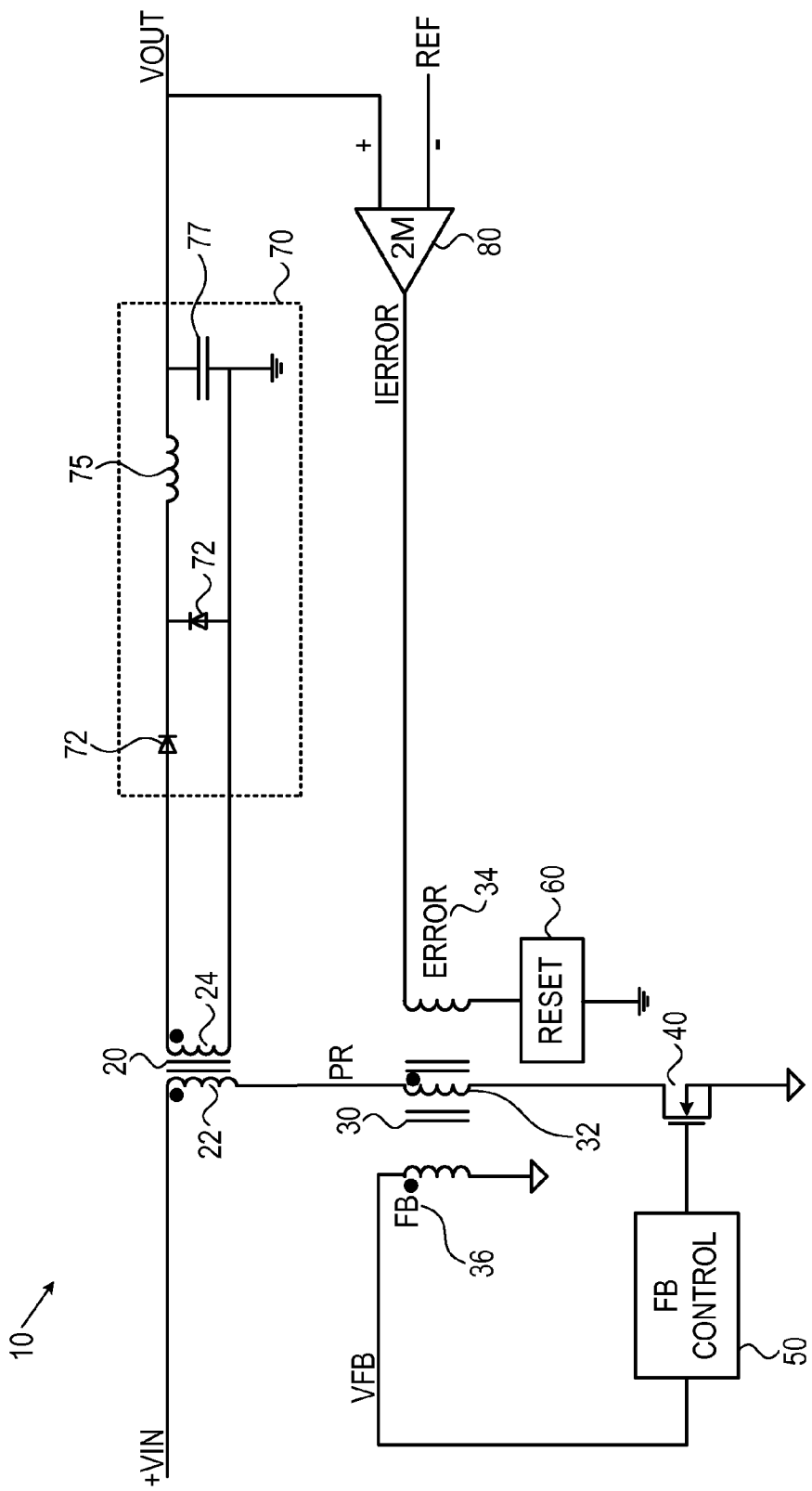
FIG. 1 illustrates a high level schematic diagram of an exemplary embodiment of a power converter wherein output voltage error information is fed back to a sense transformer, and added to a primary side electronically controlled switch current.

Before explaining at least one embodiment in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. The term connected as used herein is not meant to be limited to a direct connection, and the use of appropriate resistors, capacitors and inductors does not exceed the scope thereof.

FIG. 1 illustrates a high level schematic diagram of an exemplary embodiment of a power converter 10 wherein output voltage error information is fed back to a sense transformer 30, and added to the current of an electronically controlled switch 40, which is illustrated without limitation as an NFET, power converter 10 further comprising: a power transformer 20; a sense transformer 30; a control circuitry 50; a reset mechanism 60; a power conversion circuitry 70, illustrated without limitation as a forward converter, more particularly as an isolated forward buck converter; and a transconductance error amplifier 80. Power transformer 20 comprises a primary winding 22 and a secondary winding 24 magnetically coupled to primary winding 22. Sense transformer 30 comprises a plurality of magnetically coupled windings, denoted: a primary current sense winding 32, an error current sense winding 34 and a feedback winding 36. Power conversion circuitry 70 comprises a first and a second unidirectional electronic valve 72, each illustrated without limitation as a diode, an inductor 75 and an output capacitor 77.

A DC input voltage, denoted VIN, is connected to a first end of primary winding 22 of power transformer 20, denoted with a dot for polarity, and a second end of primary winding 22 is connected to a first end of primary current sense winding 32 of sense transformer 30, denoted with a dot for polarity. A second end of primary current sense winding 32 is connected to the drain of electronically controlled switch 40, and the source of electronically controlled switch 40 is connected to a common primary side return for VIN. A first end of feedback winding 36, denoted with a dot for polarity, is connected to a feedback input of control circuitry 50 via a lead denoted VFB, and a second end of feedback winding 36 is connected to the common primary side return for VIN. An output of control circuitry 50 is connected to the gate of electronically controlled switch 40.

A first end of secondary winding 24 of power transformer 20, denoted with a dot for polarity, is connected to the anode of first unidirectional electronic valve 72, and the cathode of first unidirectional electronic valve 72 is connected to the cathode of second electronic valve 72 and to a first end of inductor 75. A second end of inductor 75 is connected to a first end of output capacitor 77, an output lead denoted VOUT, and to the non-inverting input of transconductance error amplifier 80. A second end of secondary winding 24 is connected to the anode of second unidirectional electronic valve 72, a second end of output capacitor 77 and a secondary side common potential. The inverting input of transconductance error amplifier 80 is connected to a reference voltage denoted REF, and the output of transconductance error amplifier 80 is connected to a first end of error current sense winding 34, denoted with a dot for polarity. A second end of error current sense winding 34 is connected to a first end of reset mechanism 60, and a second end of reset mechanism 60 is connected to the secondary side common potential.

In operation, control circuitry 50 is arranged to alternately open and close electronically controlled switch 40, and to adjust the duty cycle of electronically controlled switch 40 responsive to the feedback input of control circuitry 50. When electronically controlled switch 40 is closed current is drawn from VIN through primary winding 22 and through primary current sense winding 32, with the amount of current increasing over time. The increasing current is further reflected at feedback winding 36 and fed to the feedback input of control circuitry 50 via feedback mechanism 55 as a ramping voltage VFB.

The increasing current through primary winding 22 is reflected at secondary winding 24, rectified by first unidirectional electronic valve 72 and filtered by the combination of inductor 75 and output capacitor 77 to develop VOUT. Filtered output voltage VOUT is compared with reference voltage REF by transconductance error amplifier 80 to develop an error current at the output of transconductance error amplifier 80, denoted IERROR, whose direction and value reflect the difference between VOUT and reference voltage REF. Current IERROR is fed to error current sense winding 34, and added to the current at feedback winding 36 fed to the feedback input of control circuitry 50. As indicated by the polarity of the windings, when VOUT increases above reference voltage REF, IERROR increases the rate of change of voltage VFB seen at the feedback input of control circuitry 50, and when VOUT decreases below reference voltage REF, IERROR decreases the rate of change of voltage VFB seen at the feedback input of control circuitry 50.

When electronically controlled switch 40 is open, no current flows through primary current sense winding 32, and voltage VFB rapidly falls to zero. Reset mechanism 60 acts to reset the flux in sense transformer 30 whenever electronically controlled switch 40 is open. In an exemplary embodiment, VFB is a ramp voltage whose ramp rate is adjusted by IERROR, as will be described further below in relation to FIG. 2.

The above has been illustrated as a forward converter, particularly a forward buck converter, however this is not meant to be limiting in any way, and any isolated converter may be implemented without exceeding the scope. In one particular embodiment, a current feed forward converter is implemented.

The above has been described in an embodiment where current sense winding 32, in series with primary winding 22, is directly coupled to feedback winding 36, however this is not meant to be limiting in any way. In particular, a current transformer scaler may be implemented to scale the current from primary winding 22 to feedback winding 36 without exceeding the scope, as will be described further below. In one particular embodiment, feedback winding 36 is thus coupled in a scaling transformer to a secondary feedback winding. The secondary feedback winding is serially connected to a scaled feedback winding which replaces feedback winding 36 in sense transformer 30.

Figure 2:
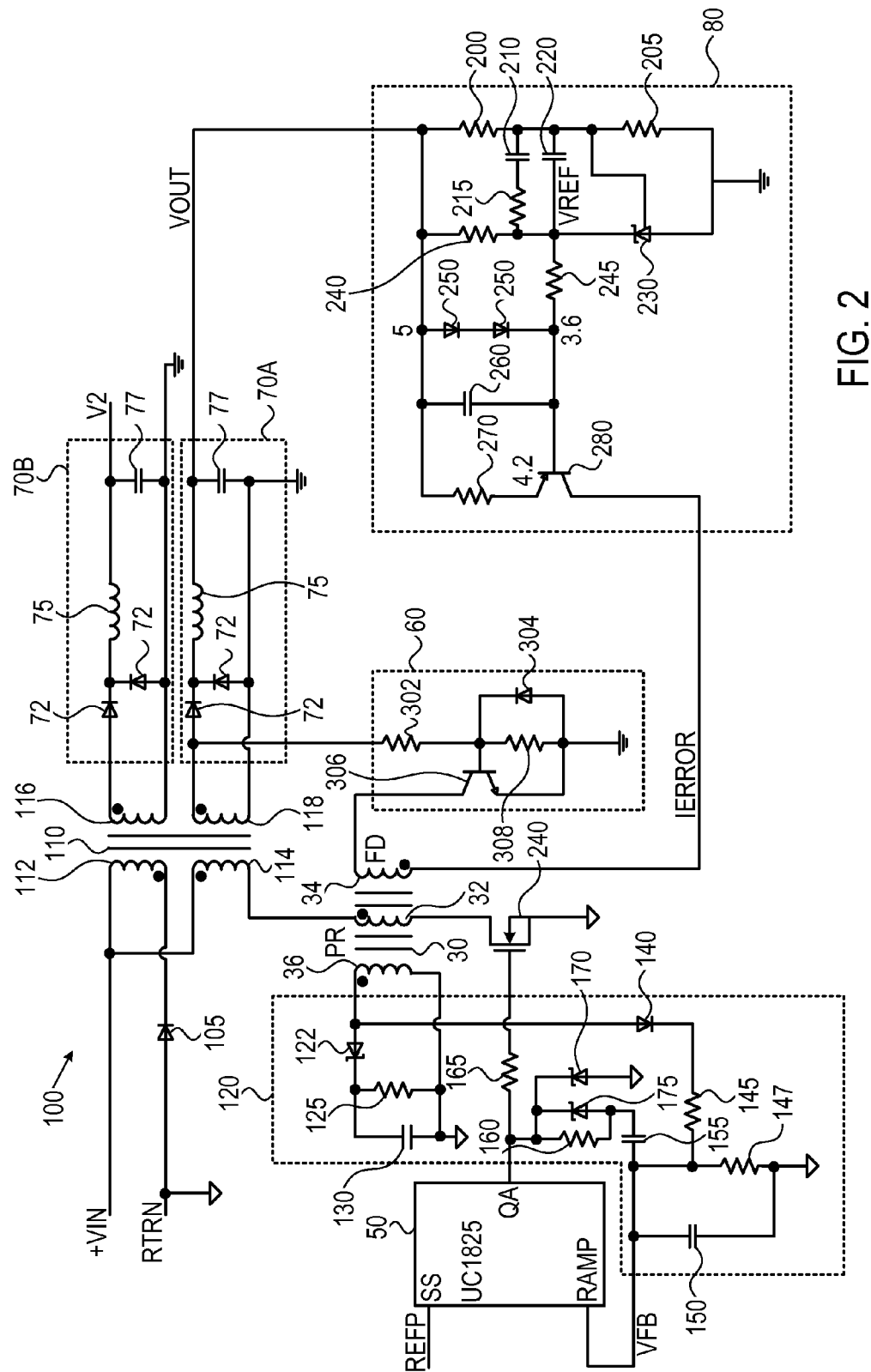
FIG. 2 illustrates a more detailed schematic diagram of a particular implementation of FIG. 1.

FIG. 2 illustrates a more detailed schematic diagram of a particular implementation 100 of FIG. 1, wherein a plurality of output voltages denoted respectively VOUT and V2 are supplied from a single input voltage VIN. Implementation 100 comprises: a sense transformer 30 constituted of a plurality of magnetically coupled windings, denoted respectively a primary current sense winding 32, an error current sense winding 34 and a feedback winding 36; an electronically controlled switch 40 illustrated without limitation as an NFET; a control circuitry 50, illustrated without limitation as a high speed PWM controller such as a UC 1825 from Texas Instruments; a feedback mechanism 55 a unidirectional electronic valve 105, illustrated without limitation as a diode; a power transformer 110 comprising a reset winding 112, a primary winding 114 and a pair of secondary windings 116 and 118; a first power conversion circuitry 70A and a second power conversion circuitry 70B; a reset mechanism 60; and a transconductance error amplifier 80.

Each of first power conversion circuitry 70A and second power conversion circuitry 70B comprises a first and a second unidirectional electronic valve 72, each illustrated without limitation as a diode, an inductor 75 and an output capacitor 77. Reset mechanism 60 comprises a resistor 302, a unidirectional electronic valve 304 illustrated without limitation as a diode, an electronically controlled switch 306 illustrated without limitation as a NPN transistor, and a resistor 308. Transconductance error amplifier 80 comprises: a resistor 200; a resistor 205; a capacitor 210; a resistor 215; a capacitor 220; a voltage reference 230, illustrated without limitation as a precision programmable reference; a bias resistor 240; a resistor 245; a pair of diodes 250; a capacitor 260; a resistor 270; and a transistor 280, illustrated as a PNP transistor. Feedback mechanism 55 comprises: a breakdown diode 122; a resistor 125; a capacitor 130; a unidirectional electronic valve 140, illustrated without limitation as a diode; a resistor 145; a resistor 147; a capacitor 150; a capacitor 155; a resistor 160; a resistor 165; a unidirectional electronic valve 170 illustrated without limitation as a diode; and a unidirectional electronic valve 175 illustrated without limitation as a diode.

The positive lead of an input voltage, denoted VIN, is connected to a first end of reset winding 112 and to a first end of primary winding 114, denoted with a dot for polarity. The return lead of the input voltage, denoted RTRN, is connected to the anode of diode 105 and to a primary side common potential, and the cathode of diode 105 is connected to a second end of reset winding 112, denoted with a dot for polarity. A second end of primary winding 114 is connected to a first end of primary current sense winding 32, denoted with a dot for polarity, a second end of primary current sense winding 32 is connected to the drain of electronically controlled switch 40, and the source of electronically controlled switch 40 is connected to the primary side common potential.

A first end of secondary winding 118, denoted with a dot for polarity, is connected to the anode of first diode 72 of first power conversion circuitry 70A. The cathode of first diode 72 of first power conversion circuitry 70A is connected to the cathode of second diode 72 of first power conversion circuitry 70A and to a first end of inductor 75 of first power conversion circuitry 70A. A second end of inductor 75 of first power conversion circuitry 70A is connected to a first end of output capacitor 77 of first power conversion circuitry 70A and to an output lead denoted VOUT. A second end of secondary winding 118 is connected to the anode of second diode 72 of first power conversion circuitry 70A, to a second end of output capacitor 77 of first power conversion circuitry 70A and to a secondary side common potential.

A first end of secondary winding 116, denoted with a dot for polarity, is connected to the anode of first diode 72 of second power conversion circuitry 70B. The cathode of first diode 72 of power conversion circuitry 70B is connected to the cathode of second diode 72 of second power conversion circuitry 70B and to a first end of inductor 75 of second power conversion circuitry 70B. A second end of inductor 75 of second power conversion circuitry 70B is connected to a first end of output capacitor 77 of second power conversion circuitry 70B and to an output lead denoted V2. A second end of secondary winding 116 is connected to the anode of second diode 72 of second power conversion circuitry 70B, to a second end of output capacitor 77 of second power conversion circuitry 70B and to the secondary side common potential.

Output lead VOUT is connected to a first end of resistor 200, to a first end of bias resistor 240, the anode of a first diode 250, a first end of capacitor 260 and a first end of resistor 270. A second end of resistor 200 is connected to a first end of capacitor 210, to a first end of capacitor 220, to a first end of resistor 205 and to the reference input of precision programmable reference 230. A second end of resistor 205 and the anode of precision programmable reference 230 are connected to the secondary side common potential. A second end of bias resistor 240 is connected to a first end of resistor 215, to a second end of capacitor 220, to the cathode of programmable precision reference 230 and to a first end of resistor 245. A second end of resistor 215 is connected to a second end of capacitor 210. The cathode of first diode 250 is connected to the anode of second diode 250 and the cathode of second diode 250 is connect to a second end of resistor 245, a second end of capacitor 260 and the base of transistor 280. A second end of resistor 270 is connected to the emitter of transistor 280, and the collector of transistor 280 is connected to a first end of error current sense winding 34, denoted with a dot for polarity, the connection carrying signal IERROR.

A second end of error current sense winding 34 is connected to the collector of electronically controlled switch 306, and the base of electronically controlled switch 306 is connected to the cathode of diode 304, to a first end of resistor 308 and via resistor 302 to the dot end of secondary winding 118. The emitter of electronically controlled switch 306, a second end of resistor 308 and the anode of diode 304 are each connected to the secondary side common potential.

A first end of feedback winding 36, denoted with a dot for polarity, is connected to the anode of breakdown diode 122 and to the anode of diode 140. The cathode of breakdown diode 122 is connected to a first end of resistor 125 and to a first end of capacitor 130. A second end of feedback winding 36 is connected to a second end of capacitor 130, to a second end of resistor 125 and to the primary side common potential.

The cathode of diode 140 is connected to a first end of resistor 145, and a second end of resistor 145 is connected to a first end of resistor 147, a first end of capacitor 155, a first end of capacitor 150 and to the ramp input of control circuitry 50, and denoted feedback voltage VFB. The soft start input of control circuitry 50 is connected to a fixed reference voltage denoted REFP, and the control output of control circuitry 50, is connected via resistor 165 to the gate of electronically controlled switch 40, to a first end of resistor 160, to the anode of diode 170 and the cathode of diode 175. A second end of capacitor 155 is connected to a second end of resistor 160 and to the anode of diode 175. The anode of diode 170, a second end of capacitor 150 and a second end of resistor 147 are connected to the primary side common potential.

Figure 4:
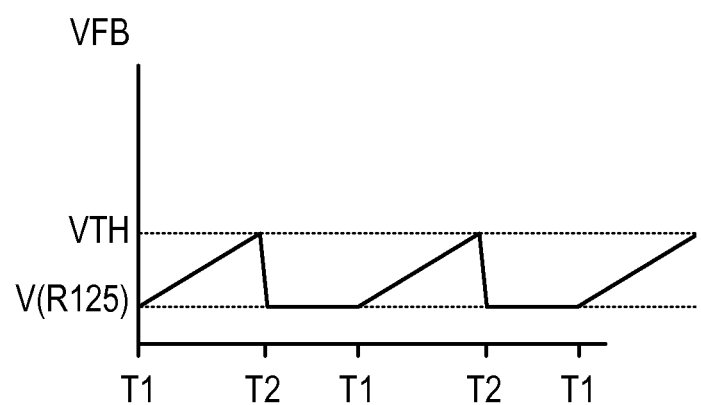
FIG. 4 illustrates certain voltage waveforms of the embodiment of FIG. 2.

FIG. 4 illustrates the waveform of feedback voltage VFB of FIG. 2, wherein the y-axis represents voltage and the x-axis represents time, FIGS. 2 and 4 being taken together.

In operation, input voltage VIN appears across input terminals VIN and RTRN. When control circuitry 50 closes electronically controlled switch 40, current is drawn through primary winding 114, with the amount of current increasing over time. The current drawn through primary winding 114 flows through primary current sense winding 32, and is reflected in secondary winding 116, secondary winding 118 and sense winding 36, responsive to the respective turns ratios. Output voltage VOUT and V2 are generated responsive to the respective turns ratio, reference voltage REFP, and further responsive to any error voltage as will be described further hereinto below. When electronically controlled switch 40 is opened responsive to control circuitry 50, no current flows through primary winding 114 and primary current sense winding 32, with the flux of power transformer 110 discharging through secondary windings 116, 118 and the respective diodes 72. Electronically controlled switch 306 is closed whenever electronically controlled switched 40 is closed thereby providing a ground path for current only when electronically controlled switch 40 is closed.

Precision programmable reference 230, which in an exemplary embodiment is a TL1431 available from Texas Instruments, sets VREF responsive to values of resistor 200 and resistor 205, which are arranged to adjust the range of VOUT to be consonant with an internal reference voltage, with loop compensation provided by capacitor 220 in parallel with the series combination of capacitor 210 and resistor 215, and bias provided by bias resistor 240. In the event that the voltage at the reference input of precision programmable reference 230 increases, additional current is drawn by programmable precision reference 230 through the base of transistor 280, provided via resistor 270, which is amplified in the collector current IERROR of transistor 280. In the event that the voltage at the reference input of precision programmable reference 230 decreases, a reduced amount of current is drawn by precision programmable reference 230 through the base of transistor 280, which is amplified as a reduced collector current IERROR of transistor 280. First and second diodes 250 set the base voltage of transistor 280, and capacitor 260 provides filtering of the action of transistor 280.

The increased or decreased current IERROR is fed to error current sense winding 34 which reflects the current with an opposing polarity to feedback winding 36, with a path to ground provided via electronically controlled switch 306. Thus the current through feedback winding 36 reflects the combination of IERROR and the current through electronically controlled switch 40. Resistors 302 and 308 provide bias for electronically controlled switch 306 and diode 304 provides protection.

Current through feedback winding 36 develops a voltage across resistor 125, and the voltage is filtered by the action of capacitor 130. As described above, the current through feedback winding 36 is proportional to the current through electronically controlled switch 40 plus the current of signal IERROR.

Breakdown diode 122 is arranged so that when electronically controlled switch 40 is open, and thereby no current flows through primary current sense winding 34, and responsive to electronically controlled switch 306 no current flows through error current sense winding 34, and sense transformer 30 resets through reverse flow through breakdown diode 122, as the voltage across feedback winding 36 reverses.

The voltage developed across resistor 125 is fed via diode 140, whose voltage drop compensates for the voltage drop of breakdown diode 122, and thus the voltage appearing at the cathode of diode 140 is approximately the same as the voltage appearing across resistor 125, and at least a portion of this voltage appears across resistor 147 and capacitor 150. In one embodiment, the resistance of resistor 145 is much smaller than resistance of resistor 147 (about $\frac{1}{250}^{th}$ of the value), and thus effectively all of the voltage developed across resistor 125 appears across resistor 147 and is stored across capacitor 150.

The network of diode 175, resistor 160 and capacitor 155 creates a ramp voltage for feedback voltage VFB, responsive to the pulsed output of QA which turns on at time T1, closing electronically controlled switch 40, and turns off at time T2, opening electronically controlled switch 40. The ramp voltage is added to the voltage stored across capacitor 150 described above, to develop voltage VFB as shown in FIG. 3. Control circuitry 50 is arranged to open electronically controlled switch 40 responsive to feedback voltage VFB crossing a predetermined threshold, denoted VTH, which in one embodiment is 1.25 Volts. Thus, when voltage VOUT exceeds reference voltage VREF, with the appropriate scaling of resistors 200, 205, an increased error current IERROR is created, thereby increasing the base of ramp voltage VFB, illustrated as voltage V(R125) and accelerating the shut off of electronically controlled switch 40. When voltage VOUT is less than reference voltage VREF, with the appropriate scaling of resistors 200, 205, a decreased error current IERROR is created, thereby decreasing the base of ramp voltage VFB, i.e. V(R125) and retarding the shut off of electronically controlled switch 40.

Figure 3:
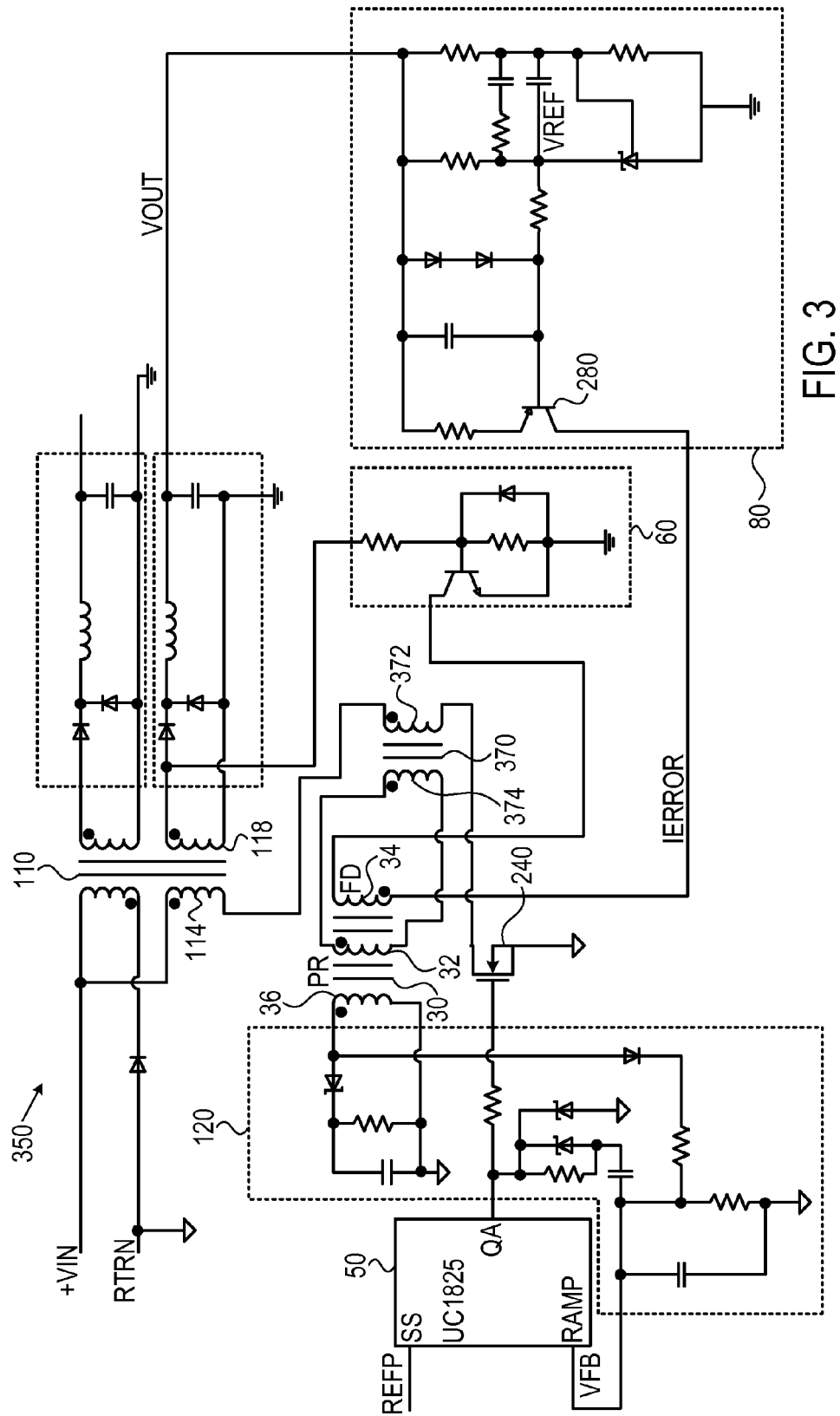
FIG. 3 illustrates a schematic diagram of an implementation similar to the implementation of FIG. 2 further comprising a current scaler.

FIG. 3 illustrates an implementation 350 which is in all respects similar to implementation 100 of FIG. 2 with the addition of a current scaler 370 comprising first winding 372 magnetically coupled to a second winding 376. The second end of primary winding 114 is connected to a first end of first winding 372, denoted with a dot for polarity. A second end of first winding 372 is connected to the drain of electronically controlled switch 240.

A first end of second winding 376, denoted with a dot for polarity, is connected to the first end of primary current sense winding 32. A second end of second winding 376 is connected to the second end of primary current sense winding 32.

In operation, implementation 350 is in all respects similar to the operation of implementation 100, with the exception that scaler 370 enables the use of a single control circuitry design for numerous output current levels. This is achieved by ensuring that the current received by control circuitry is scaled so as to be the same irrespective of load. Scaling is achieved by adjusting the turns ratio of current scaler 370. The current through electronically controlled switch 240 passes through first winding 372, is scaled by the turns ratio and is reflected in second winding 376. The scaled current reflected in second winding 376 passes through primary current sense winding 32, to which it is serially connected in a closed loop.

Figure 5:
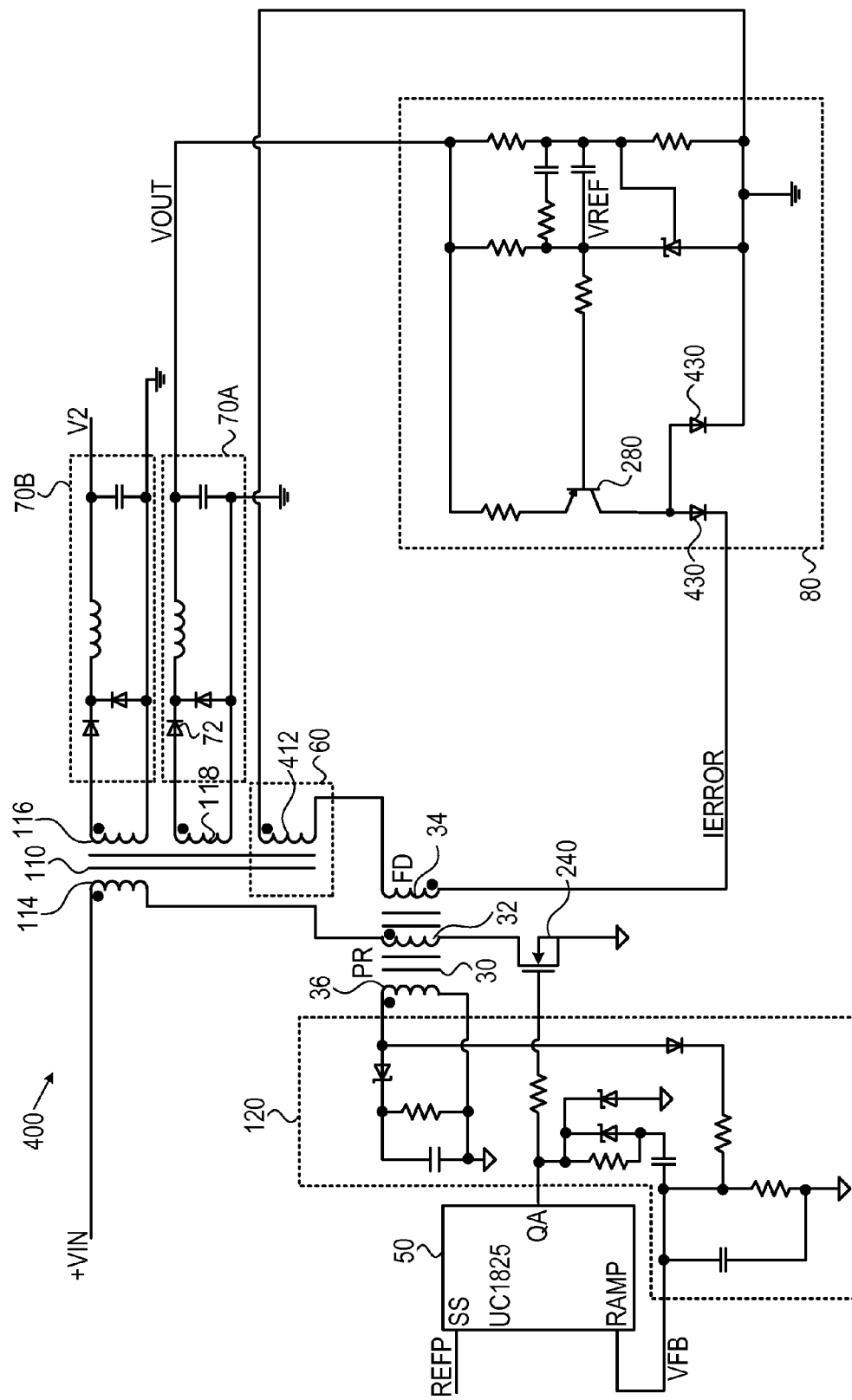
FIG. 5 illustrates an alternative embodiment of a reset mechanism for resetting the flux in the sense transformer.

FIG. 5 illustrates an alternative configuration for the circuitry of FIG. 2, wherein reset mechanism 60 is implemented in a reset winding on a power transformer, the circuitry generally denoted implementation 400. Implementation 400 is in all respects similar to implementation 100 except as detailed below. An additional transformer 410 is provided, comprising a first winding 412 and a second winding 416, and further denoted reset mechanism 60.

The positive lead of input voltage V1 is connected to a first end of primary winding 114, denoted with a dot for polarity. A reset winding with a clamp for power transformer 110 is not shown for clarity. The second end of primary winding 114 is connected to a first end of first winding 412, denoted with a dot for polarity. A second end of first winding 412 is connected to the first end of current sense winding 32, as described above in relation to implementation 100.

The collector of transistor 280 is connected to the first end of current sense winding 34 via a first diode 430, the connection from the cathode of first diode 430 to the first end of current sense winding 34 carrying signal IERROR. In parallel, the collector of transistor 280 is connected to the secondary side common potential via a second diode 430. The second end of current sense winding is connected to a first end of second winding 416, and the second end of second winding 416, denoted with a dot for polarity, is connected to the secondary side common potential.

In operation, as described above, transistor 280 produces an error current denoted signal IERROR, which is fed to error current sense winding 34, and reflected at feedback winding 36 added to the current reflected from primary current sense winding 32. Reset is performed by transformer 410 which is arranged to provide a potential lower than the secondary side common potential to the second end of current sense winding 34 responsive to electronically controlled switch 240 being closed, and a potential greater than the secondary side common potential to the second end of current sense winding 34 responsive to electronically controlled switch 240 being opened. First diode 430 is arranged such that when transformer 410 provides a potential lower than the secondary side common potential current flows through current sense winding 34 clearing the flux.

Figure 6:
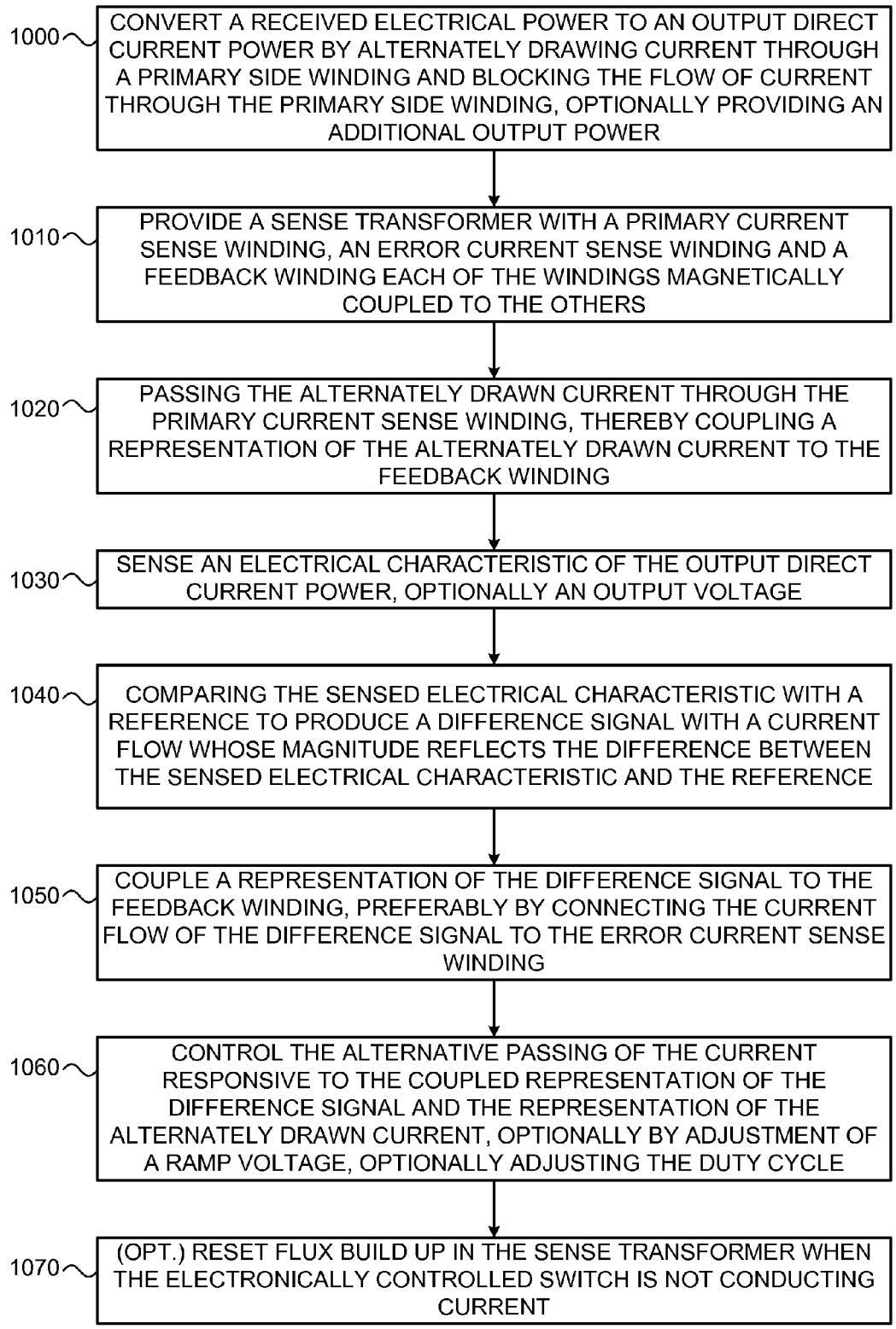
FIG. 6 illustrates a high level flow chart of an exemplary embodiment of a method of controlling a power converter.

FIG. 6 illustrates a high level flow chart of an exemplary embodiment of a method of controlling a power converter. In stage 1000, a received electrical power is converted to a direct current output power by alternately drawing current through a primary side winding, such as primary winding 22, primary winding 114 or primary winding 112 of FIGS. 1, 2, 3 and 5, respectively, and blocking the flow of current through the primary side winding. Optionally, an additional output power, which in one embodiment is not directly controlled, is further provided, as described above in relation to V2.

In stage 1010, a sense transformer is provided, the provided sense transformer exhibiting three windings: a primary current sense winding; an error current sense winding; and a feedback winding. It is to be understood that the names of the windings of the provided sense transformer are illustrative and not limiting whatsoever. Additional windings may be provided, without exceeding the scope. Each of the windings is magnetically coupled to the others, as described above in relation to sense transformer 30.

In stage 1020, the alternately drawn current is passed through the primary current sense winding of the provided sense transformer of stage 1010, thereby coupling a representation of the alternately drawn current to the feedback winding.

In stage 1030, an electrical characteristic of the output direct current power is sensed, such as an output voltage, preferably scaled, as described above in relation to VOUT. In stage 1040 the sensed electrical characteristic of stage 1030 is compared with a reference, preferably a reference voltage, to produce a difference signal. The difference signal exhibits a current flow whose amount reflects the difference between the sensed electrical characteristic and the reference.

In stage 1050 a representation of the difference signal is coupled to the feedback winding, as described above in relation to error signal IERROR, preferably by connecting the difference signal current flow to the error current sense winding.

In stage 1060, the alternative passing of the current is controlled responsive to the coupled representation of the difference signal of stage 1050 and the representation of the alternately drawn current of stage 1020. Optionally the control is performed by adjustment of a ramp voltage, as described in relation to feedback mechanism 55 and control circuitry 50 of FIG. 2. Optionally the control adjusts the duty cycle of a pulse width modulated signal controlling electronically controlled switch 40.

In optional stage 1070, any flux build up in the provided sense transformer of stage 1010 is reset when the electronically controlled switch is not conducting current, as described above in relation to reset mechanism 60 of FIGS. 1 and 2.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

I claim:

1. A power converter comprising:
a control circuitry;
an electronically controlled switch responsive to an output of said control circuitry;
a power transformer exhibiting a primary winding and a secondary winding magnetically coupled to the primary winding of the power transformer, said power transformer arranged such that when said electronically controlled switch is closed a current flows through said primary winding, the amount of primary winding current changing over time;
a sense transformer comprising a primary current sense winding, an error current sense winding and a feedback winding, each of the primary current sense winding and the error current sense winding of said sense transformer magnetically coupled to the feedback winding of said sense transformer, the primary current sense winding of said sense transformer and the primary winding of said power transformer coupled in series with said electronically controlled switch and with a source of electrical power; and
a transconductance error amplifier coupled to an output of the secondary winding of said power transformer, said transconductance amplifier arranged to drive an error current through the error current sense winding of said sense transformer, wherein the amount of the error current reflects a difference between an electrical characteristic of the output of the secondary winding of said power transformer and a reference value,
wherein the feedback winding of said sense transformer is coupled to a feedback input of the control circuitry, said feedback winding arranged to provide the feedback input of the control circuitry with a combined signal reflective of both the amount of current flowing through the primary current sense winding and the amount of the error current.

2. The power converter according to claim 1, further comprising a reset mechanism in communication with said sense transformer and arranged to reset the flux build up in the sense transformer during the period when said electronically controlled switch is not conducting current.

3. The power converter according to claim 1, wherein the combined feedback signal is a ramp voltage whose rate of change is responsive to the amount of the error current.

4. The power converter according to claim 1, wherein the control circuitry is a pulse width modulation controller.

5. The power converter according to claim 1, wherein the electrical characteristic of the output of the secondary winding of said power transformer is an output voltage variance from a reference.

6. The power converter according to claim 1, wherein said power transformer further comprises an auxiliary secondary winding magnetically coupled to the primary winding of the power transformer, said auxiliary secondary winding arranged to provide an output different from the output of the secondary winding of said power transformer.

7. The power converter according to claim 1, wherein said control circuitry is arranged to:
compare the combined signal received at the feedback input to a threshold voltage; and
open said electronically controlled switch responsive to the combined signal exceeding the threshold voltage.

8. A method of controlling a power converter having a primary side winding and a secondary side winding isolated from the primary side winding, the method comprising:
converting a received electrical power to an output direct current power by alternately drawing current through the primary side winding and blocking the flow of current through the primary side winding;
providing a sense transformer comprising a primary current sense winding, an error current sense winding and a feedback winding, each of the primary current sense winding and the error current sense winding of said sense transformer magnetically coupled to the feedback winding of said provided sense transformer;
passing the current alternately drawn through the primary side winding through the primary current sense winding of said provided sense transformer, thereby coupling a representation of the alternately drawn current to the feedback winding, said alternately drawn current coupled to the feedback winding changing over time;
sensing an electrical characteristic of the output direct current power;
comparing said sensed electrical characteristic to a reference value so as to produce a difference signal, said produced difference signal exhibiting a current flow whose amount reflects the difference between said sensed electrical characteristic and the reference value;
coupling said current flow of said difference signal to the error current sense winding of said provided sense transformer, thereby coupling a representation of said difference signal to the feedback winding, said feedback winding thereby arranged to output a combined signal reflective of both the representation of the alternately drawn current and the produced difference signal;
and controlling said alternatively passing of the current responsive to the combined signal.

9. The method according to claim 8, further comprising resetting flux build up in the sense transformer during the period when said electronically controlled switch is not conducting current 10. The method according to claim 8, wherein said combined signal is a ramp voltage whose rate of change is responsive to the amount of the current flow of said difference signal.

11. The method according to claim 8, wherein said controlling of said alternatively passing of the current comprises adjusting the duty cycle of a pulse width modulated signal.

12. The method according to claim 8, wherein the electrical characteristic of the output direct current power is an output voltage.

13. The method according to claim 8, wherein said converting a received direct current power to an output direct current power further comprises providing an additional output power.

14. The method according to claim 8, wherein said controlling said alternatively passing of the current responsive to the combined signal comprises:
comparing the combined signal to a threshold voltage; and
opening said electronically controlled switch responsive to the combined signal exceeding the threshold voltage.

15. A power converter comprising:
a means for receiving an input direct current power;
a control circuitry;
an electronically controlled switch responsive to an output of said control circuitry;
a power transformer exhibiting a primary winding coupled to said means for receiving an input direct current power and a secondary winding magnetically coupled to the primary winding of said power transformer, said power transformer arranged such that when said electronically controlled switch is closed a current flows through said primary winding, the amount of primary winding current changing over time;
a sense transformer comprising a primary current sense winding, an error current sense winding and a feedback winding, each of the primary current sense winding and the error current sense winding of said sense transformer magnetically coupled to the feedback winding of said sense transformer, the primary current sense winding of said sense transformer and the primary winding of said power transformer coupled in series with said electronically controlled switch and with a source of electrical power;
a transconductance error amplifier coupled to an output of the secondary winding of said power transformer, said transconductance amplifier arranged to drive an error current through the feedback winding of said sense transformer, wherein the amount of the error current reflects a difference between an electrical characteristic of the output of the secondary winding of said power transformer and a reference value,
wherein the feedback winding of said sense transformer is coupled to a feedback input of the control circuitry, said feedback winding arranged to provide the feedback input of the control circuitry with a combined signal reflective of both the amount of current flowing through the primary current sense winding and the amount of the error current.

16. The power converter according to claim 15, further comprising a reset mechanism in communication with said sense transformer and arranged to reset the flux build up in said sense transformer during the period when said electronically controlled switch is not conducting current 17. The power converter according to claim 15, wherein the combined feedback signal is a ramp voltage whose rate of change is responsive to the amount of the error current.

18. The power converter according to claim 15, wherein said control circuitry is a pulse width modulation controller.

19. The power converter according to claim 15, wherein the electrical characteristic of the output of the secondary winding of said power transformer is an output voltage variance from a reference.

20. The power converter according to claim 15, wherein said power transformer further comprises an auxiliary secondary winding magnetically coupled to the primary winding of the power transformer, said auxiliary secondary winding arranged to provide an output different from the output of the secondary winding of said power transformer.

* * * * *